(12) United States Patent
Suerbaum

(10) Patent No.: US 6,807,153 B1
(45) Date of Patent: Oct. 19, 2004

(54) METHOD FOR TESTING THE AVAILABILITY OF THE SIGNALLING POINTS OF A SWITCHING NETWORK

(75) Inventor: Clemens Suerbaum, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/622,970

(22) PCT Filed: Feb. 5, 1999

(86) PCT No.: PCT/DE99/00308

§ 371 (c)(1),
(2), (4) Date: Aug. 24, 2000

(87) PCT Pub. No.: WO99/44372

PCT Pub. Date: Sep. 2, 1999

(30) Foreign Application Priority Data

Feb. 27, 1998 (DE) .......................................... 198 08 524

(51) Int. Cl.[7] .............................................. H04L 3/08
(52) U.S. Cl. ....................... 370/248; 370/393; 370/244; 370/522
(58) Field of Search ................................ 370/242, 244, 370/246, 248, 249, 250, 254, 256, 393, 522, 216; 379/1.01, 15.02, 112.05, 221.07; 395/183.21

(56) References Cited

U.S. PATENT DOCUMENTS

| | | | | |
|---|---|---|---|---|
| 4,745,593 A | * | 5/1988 | Stewart | 370/244 |
| 5,583,848 A | * | 12/1996 | Glitho | 370/248 |
| 5,634,097 A | * | 5/1997 | Ashi et al. | 714/45 |
| 5,715,294 A | * | 2/1998 | Pester, III | 379/32.03 |
| 6,118,936 A | * | 9/2000 | Lauer et al. | 709/224 |
| 6,147,965 A | * | 11/2000 | Burns et al. | 370/216 |
| 6,154,448 A | * | 11/2000 | Petersen et al. | 370/248 |
| 6,266,325 B1 | * | 7/2001 | Ishioka et al. | 370/248 |

OTHER PUBLICATIONS

International Telecommunications Union: ITU–T Q.751/1 (10/95) Network Element Management Information Model for the Message Transfer Part (MTP).*

International Telecommunications Union: ITU–T Q.753 (06/97) Signalling System No. 7 management functions MRVT, SRVT and CVT and definition of the OMA-SE–user.*

International Telecommunications Union: ITU–T Q.754 (06/97) Signalling System No. 7 management Application Service Element (ASE) definitions.*

* cited by examiner

Primary Examiner—Wellington Chin
Assistant Examiner—John Shew
(74) Attorney, Agent, or Firm—Morrison & Foerster LLP

(57) ABSTRACT

Method for testing the availability of signaling points which switches through messages in digital form, the MRVT (Message Transfer Part, Route Verification Test) protocol method standardized in the Recommendations Q751.1, Q753 and Q754 of the ITU-T is inventively developed in such a way that it is possible to determine the actually used signaling routes from the test starting point to the test destination.

2 Claims, 2 Drawing Sheets

| PCTL | | | | | | CRIL | | | | | AWGR =CR? |
|---|---|---|---|---|---|---|---|---|---|---|---|
| A | U | X | B | | | CR | CR | CR | | | YES |
| A | U | Y | B | | | CR | CR | CR | | | YES |
| A | U | B | | | | CR | pr | | | | NO |
| A | U | V | X | B | | CR | pr | CR | CR | | NO |
| A | U | V | Y | B | | CR | pr | CR | CR | | NO |
| A | U | V | B | | | CR | pr | pr | | | NO |
| A | U | V | X | Y | B | CR | pr | CR | pr | CR | NO |
| A | U | V | Y | X | B | CR | pr | CR | pr | CR | NO |
| A | V | X | B | | | CR | CR | CR | | | YES |
| A | V | Y | B | | | CR | CR | CR | | | YES |
| A | V | B | | | | CR | pr | | | | NO |
| A | V | U | X | B | | CR | pr | CR | CR | | NO |
| A | V | U | Y | B | | CR | pr | CR | CR | | NO |
| A | V | U | B | | | CR | pr | CR | | | NO |
| A | V | U | X | Y | B | CR | pr | CR | pr | CR | NO |
| A | V | U | Y | X | B | CR | pr | CR | pr | CR | NO |
| A | X | B | | | | pr | CR | | | | NO |
| A | X | Y | B | | | pr | pr | CR | | | NO |
| A | Y | B | | | | pr | CR | | | | NO |
| A | Y | X | B | | | pr | pr | CR | | | NO |

FIG 3

| PCTL | | | | | | CRIL | | | | | AWGR =CR ? |
|---|---|---|---|---|---|---|---|---|---|---|---|
| A | U | X | B | | | CR | CR | CR | | | YES |
| A | U | Y | B | | | CR | CR | CR | | | YES |
| A | U | B | | | | CR | pr | | | | NO |
| A | U | V | X | B | | CR | pr | CR | CR | | NO |
| A | U | V | Y | B | | CR | pr | CR | CR | | NO |
| A | U | V | B | | | CR | pr | pr | | | NO |
| A | U | V | X | Y | B | CR | pr | CR | pr | CR | NO |
| A | U | V | Y | X | B | CR | pr | CR | pr | CR | NO |
| A | V | X | B | | | CR | CR | CR | | | YES |
| A | V | Y | B | | | CR | CR | CR | | | YES |
| A | V | B | | | | CR | pr | | | | NO |
| A | V | U | X | B | | CR | pr | CR | CR | | NO |
| A | V | U | Y | B | | CR | pr | CR | CR | | NO |
| A | V | U | B | | | CR | pr | CR | | | NO |
| A | V | U | X | Y | B | CR | pr | CR | pr | CR | NO |
| A | V | U | Y | X | B | CR | pr | CR | pr | CR | NO |
| A | X | B | | | | pr | CR | | | | NO |
| A | X | Y | B | | | pr | pr | CR | | | NO |
| A | Y | B | | | | pr | CR | | | | NO |
| A | Y | X | B | | | pr | pr | CR | | | NO |

METHOD FOR TESTING THE AVAILABILITY OF THE SIGNALLING POINTS OF A SWITCHING NETWORK

BACKGROUND OF THE INVENTION

1. Field of the Invention

The invention relates to a method for testing the availability of a destination signaling point (B) 2 in a switching network formed by a multiplicity of signaling points (A, . . . , Y), based on the MRVT (Message Transfer Part, Route Verification Test) protocol method standardized in the Recommendations Q.751.1, Q.753 and Q.754 (Recommendations) of the ITU-T (International Telecommunication Union-Standards Sector).

2. Description of the Related Art

At present it is not possible, or not defined in the Recommendations, to use this test to also find out which of the totality of all the possible signaling routes (possible routes) from, the source to the destination are currently actually being used (current routes).

SUMMARY OF THE INVENTION

The invention is based on the object of specifying a test method which determines the actually used signaling route sections (current routes) in a signaling network in real time.

The object is achieved via a method for testing the availability of a destination signaling point in a switching network formed by a multiplicity of signaling points, based on the Message Transfer Part, Route Verification Test protocol method standardized in the Recommendations Q.751.1, Q.753 and Q.754 of the International Telecommunication Union-Standards Sector, according to which a result message is defined as extendable, comprising the step of providing information items about availability of the signaling points on signaling route sections which connect the signaling points in a parameter of the result message defined as extendable.

The invention provides a network operator with information items which the network operator can use to verify whether and planning data are indeed realized in the actual network. Information items are determined which were not accessible in this simple manner (i.e., e.g., without a complicated and difficult to synchronize read-out of the current network data from the various signaling points). The protocols that are used, TCAP Transaction Capability Part and SCCP Signaling Connection Control Part), can continue to be used unchanged. The extended test according to the invention is compatible with present standards. The invention develops a test which was actually designed only for testing semipermanent data, in such a way that it can also be used for determining transient data in the, signaling network. The extension, according to the invention, of the MRVT enables the latter also to be used to find out the signaling routes from the test starting point to the test destination which are currently used in the network.

BRIEF DESCRIPTION OF THE DRAWINGS

An exemplary embodiment of the invention is explained in more detail below with reference to the figures below:

FIG. 3 is a table which represents an assignment between the individual signaling route sections and the nature of the signaling route sections.

In the figures, identical designations designate identical elements.

DESCRIPTION OF THE PREFERRED EMBODIMENTS

Figures 1, 2:
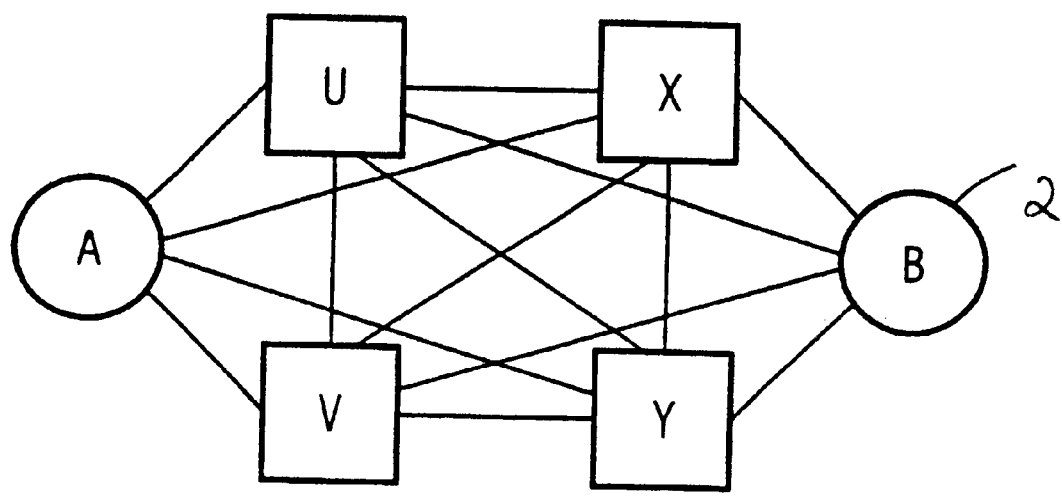
FIG. 1 is a schematic illustration of signaling points of a signaling network with the signaling route sections which connect the signaling points.
FIG. 2 is a table which represents the availability and the nature thereof of signaling points connected to a respective signaling point.

FIG. 1 shows a signaling network, formed by signaling points A . . . Y, of a switched network which switches through messages in digital form, with signaling route sections which connect the signaling points.

FIG. 2 shows a table in which the signaling route sections which are set up with respect to the signaling point B, element 2, are represented for the individual signaling point, signaling route sections which lead to signaling points indicated in hatched areas indicating actually used signaling route sections cR of high priority, which experts also refer to as current routes.

FIG. 3 shows a table which represents, for the signaling network illustrated in FIG. 1, an assignment between the possible signaling routes indicated under the heading PCTL (denoting: Point Code Traversed List), the nature of the signaling route sections traversed in the process, which is indicated under the heading CRIL (denoting: Current Route Indicator List), and the evaluation result as to whether the whole route is an actually used route, the evaluation result being indicated under the heading Auswertung Gesamtroute [evaluation of whole route] AWGR=CR?.

The test method MRVT (Message Transfer Part Route Verification Test) standardized by the ITU-T in Recommendations Q.751.1, Q.753 and Q.754 serves for testing the semipermanent Routing Tables of the Message Transfer Part (MTP). To that end, it sends and receives test messages in the snowball system. The test messages with the complete results contain the designations of the signaling points traversed, which experts also refer to as signaling point codes, along the route from the test source to the test destination and also the associated priorities of the sections of the signaling route.

According to the application, that parameter of the result message which is defined as extendable in the Recommendations is extended by an optional parameter CRIL (denoting: currentRouteIndicatorList) (In the corresponding standards, the test messages are defined in such a way that they are extendable). This CRIL parameter contains an ordered list of entries for actually used signaling route sections cR (denoting: currentRoute)/entries for possible signaling route sections pR (denoting: possibleRoute)/entries with values uk (denoting: unknown) indicating an unknown value, which identifies whether or not the associated signaling point (i.e., one further back at a point in the pointCodeTraversedList PCTL) would have been reached via actually used signaling route sections cR. The value uk indicating an unknown value serves for achieving compatibility with MRVT signaling points which do not know this parameter. If the MRVT mechanism identifies in a signaling point that the number of entries (length) in the currentRouteIndicatorList CRIL is shorter than the number of entries (length) in the pointCodeTraversedList PCTL, then the currentRouteIndicatorList CRIL is filled with uk values to its complete length. This procedure is analogous to the handling of the optional parameter routePriorityList in Recommendation Q.753.

The respective value is determined as follows:

In the signaling point which starts the test, e.g., signaling point A, the previously unused third bit of the extendable infoRequest parameter can be used to identify whether or not the currentRouteIndicatorList CRIL is intended to be supplied, i.e., whether this extension of the MRVT is intended to be used (bit set) or is not intended to be used (bit not set). If the bit is set, then, of the adjacent signaling points which are presently possible in the direction of the test destination, the ones via which routing is currently actually occurring are determined in the test starting point. In the MRVT message with respect to these the test starting point enters the value CR "currentRoute" into the currentRouteIndicatorList CRIL, and the value PR "possibleRoute" for all others. In the intermediate stations on the signaling route, in addition to the processes which are otherwise necessary for the MRVT, the currentRouteIndicatorList CRIL is extended in a manner analogous to that in the test starting point. In error situations, it is copied into the test messages, which are sent back to the starting point of the test or the previous intermediate station. All this is done only if the currentRouteIndicatorList CRIL was requested in the received test messages by the third bit in the infoRequest Parameter. If the bit was not set, the MRVT proceeds unchanged. If a conventional signaling point is unable to extend the currentRouteIndicatorList CRIL, it copies this bit unchanged into the test messages that it is to transmit. If a signaling point that is traversed later then identifies that the length of the currentRouteIndicatorList is shorter than the pointCodeTraversedList of the received test message then it fills the currentRouteIndicatorList with "Unknown" values to its complete length.

In the test destination, e.g., signaling point B, the currentRouteIndicatorList CRIL is copied without extension into the test messages which are to be sent back to the previous intermediate station or to the starting point. This also takes place only if the currentRouteIndicatorList CRIL was requested in the received test message by the third bit in the infoRequest Parameter.

The test procedure reads from the database, particularly the Routing Table, not only (as in the case of the MRVT defined at present) the signaling points via which routing to the test destination could be effected, but also those via which routing to the test destination is actually really effected. In the manufacturer-specific switching system EWSD (Elektronisches Wählsystem Digital [digital electronic switching system]), to that end the internal number of the destination is determined and then used to read the corresponding current transient entries in the Tables from the High Performance Database (HPDB) of the Network Management on the MP:SM (Main Platform Signaling Manager), in which case, for the standard version of the MRVT, it is necessary to access only the semipermanent data in the Application Database or in the Database Management System.

After the test results have been obtained at the signaling point at which the test was started, it is possible to ascertain as follows whether a possible signaling route that has been determined is currently really used in this way in the network in its entirety: this is the case only if the currentRouteIndicator List contains exclusively CR "currentRoute" as values. If the test destination has been reached exclusively via actually used signaling route sections CR, a positive entry YES is made in the column AWGR=CR? in the table in FIG. 3, otherwise NO is entered:

The above-described method is illustrative of the principles of the present invention. Numerous modifications and adaptions thereof will be readily apparent to those skilled in this art without departing from the spirit and scope of the present invention.

What is claimed is:

1. A method for testing the availability of a destination signaling point in a switching network formed by a multiplicity of signaling points, based on the Message Transfer Part, Route Verification Test protocol method standardized in the Recommendations Q.751.1, Q.753 and Q.754 of the International Telecommunication Union-Standards Sector, according to which a result message is defined as extendable, comprising:

providing information items about availability of said signaling points on signaling route sections which connect said signaling points in a parameter of said result message defined as extendable; and indicating an availability via a high-priority, actually used signaling route section denoting a Current Route or via a low-priority, possible signaling route section denoting a possible Route by said information items that are entries denoting a Current Route Indicator List.

2. The method as claimed in claim 1, further comprising:

adding to said result message an entry which characterizes a relevant signaling route section as low priority or high priority to said result message in the course of forwarding from signaling point to signaling point;

determining, by a signaling point, a difference between said signaling point priority in an order of signaling points traversed by said result message and a number of entries in said result message; and adding to said result message a number of entries with values denoting "unknown" indicating an unknown value, said number corresponding to said difference.

* * * * *